Patented Jan. 25, 1949

2,459,991

UNITED STATES PATENT OFFICE 2,459,991

METHOD FOR MAKING SIRUP

Clarence C. Capdevielle, New York, N. Y.

No Drawing. Application December 13, 1944,
Serial No. 568,071

2 Claims. (Cl. 99—142)

This invention relates to a syrup and method for making the same, and more particularly to a molasses-sugar syrup for use in making confections.

One object of the present invention is to provide a novel syrup which will have a long life in storage, which is not subject to crystallization, which is inexpensive, and which is adapted for use in making ice creams, soft drinks, confectionery and other sweet foods.

Another object is to provide a novel method for making a syrup which includes a selected amount of sugar and non-sugar solids.

The above and further objects and novel features of the present invention will appear more fully in the following detailed description thereof.

The novel sugar syrup of the present invention as hereinafter more fully described, preferably consists of diluted molasses, preferably cane molasses, which has been bleached and filtered, having combined therewith in two separate stages, sucrose sugar, the latter in the first stage being inverted, of such quantities that the syrup contains seventy-five per cent total solids, of which five per cent is non-sugar, forty per cent is inverted sucrose and thirty per cent is non-inverted sucrose.

In the making of the novel sugar syrup, a quantity of molasses, preferably cane molasses, containing from 20 to 35 per cent non-sugar solids, is diluted with water to a density of fifteen to twenty per cent of total sugar and non-sugar solids. The diluted molasses syrup is then treated with an activated carbon, bone char, or with a suitable bleaching agent, and then filtered. Filtration of the diluted molasses removes part of the color and leaves a neutral flavor. A quantity of sucrose sugar is now dissolved in the molasses syrup until the latter shows a density of about fifty per cent of total sugar and non-sugar solids. The sucrose sugar is now inverted to prevent recrystallization of the sucrose, and this inversion may be carried out until the combined molasses and sugar solution is totally inverted or still contains ten to fifteen per cent sucrose sugar.

Inversion of the sucrose sugar may be effected with any mineral acid, such as hydrochloric acid, sulphuric acid or phosphoric acid, or with an enzyme. When mineral acids are used, one-tenth to five-tenths of one per cent of the acid is added to the molasses and sucrose sugar solution and the latter heated to 190° F., and inverted. After inversion, the acid is neutralized with a hydroxide of lime or soda, and the syrup is then filtered. Thereupon a quantity of sucrose sugar is again added until the syrup shows a density of about seventy-five per cent of total sugar and non-sugar solids. The preferred proportion of the seventy-five per cent total sugar and non-sugar solids are five per cent non-sugar, forty per cent inverted sucrose and thirty per cent non-inverted sucrose.

When the enzymes are used for inversion, the latter are added at normal room temperature, and when the syrup shows a sucrose content of about ten per cent or less, the syrup is heated to 150° F. and the inversion discontinued. Thereupon a quantity of sucrose sugar is again added until the syrup shows a density of about seventy-five per cent of total sugar and non-sugar solids.

The reaction of the above-described inversions is as follows:

$$C_{12}H_{22}O_{11}(H_2O) \rightarrow C_{12}H_{24}O_{12} = C_6H_{12}O_6 + C_6H_{12}O_6$$

If it is desired to further purify the syrup, the latter after adding the final quantity of sucrose sugar, may be diluted to a density of about forty-five per cent of total sugar and non-sugar solids, then heated to 190° F. and passed through mechanical filters, and thereafter concentrated back to a density of seventy-five per cent of total sugar and non-sugar solids by means of the usual sugar evaporation machinery.

There is thus provided a novel sugar syrup made from molasses and sucrose sugar, which is equally effective as a sweetening agent, and less expensive, as regular sugar, for use in making ice cream, soft drinks, confectionary and other sweet foods. Additionally, the sugar syrup will not crystallize, thereby having a longer storage life and a prolonged period of usefulness.

While specific percentages have been given above for the non-sugar solids, for sucrose, and the inverted sucrose, it is to be distinctly understood that these proportions may be varied depending upon the wishes of the user and that the preferred proportions only have been given.

What I claim is:

1. The method of producing a syrup for use in making confections which comprises diluting a quantity of cane molasses to a density of approximately fifteen to twenty per cent of sugar and non-sugar solids, bleaching the diluted molasses, filtering the same, increasing the density of the filtered molasses to approximately fifty per cent of sugar and non-sugar solids by dissolving sucrose therein, inverting the sucrose sugar, and thereafter increasing the density of the syrup to seventy-five per cent of sugar and non-sugar solids by adding sucrose sugar thereto.

2. The method of producing a syrup for use in making confections which comprises diluting a quantity of cane molasses to a density of approximately fifteen to twenty per cent of sugar and non-sugar solids, bleaching the diluted molasses, filtering the same, increasing the density of the filtered molasses to forty-five per cent of sugar and non-sugar solids by dissolving sucrose sugar therein, said solids consisting of approximately five per cent non-sugar and forty per cent sucrose solids, subjecting the syrup to inversion, and thereafter increasing the density of the syrup to seventy-five per cent of sugar and non-sugar solids by adding sucrose sugar thereto.

CLARENCE C. CAPDEVIELLE.

REFERENCES CITED

The following references are of record in the file of this patent:

UNITED STATES PATENTS

| Number | Name | Date |
| --- | --- | --- |
| 1,402,615 | Hughes | Jan. 3, 1922 |
| 1,850,427 | Wadsworth et al. | Mar. 22, 1932 |